(12) United States Patent
Attarde et al.

(10) Patent No.: US 8,468,538 B2
(45) Date of Patent: Jun. 18, 2013

(54) SYSTEMS AND METHODS OF DATA STORAGE MANAGEMENT, SUCH AS DYNAMIC DATA STREAM ALLOCATION

(75) Inventors: Deepak R. Attarde, Ocean, NJ (US); Parag Gokhale, Ocean, NJ (US); Michael F. Klose, Goch (DE)

(73) Assignee: CommVault Systems, Inc., Oceanport, NJ (US)

( * ) Notice: Subject to any disclaimer, the term of this patent is extended or adjusted under 35 U.S.C. 154(b) by 1137 days.

(21) Appl. No.: 12/060,151

(22) Filed: Mar. 31, 2008

(65) Prior Publication Data

US 2008/0288948 A1 Nov. 20, 2008

Related U.S. Application Data

(63) Continuation of application No. 11/963,581, filed on Dec. 21, 2007.

(60) Provisional application No. 61/007,524, filed on Dec. 22, 2006.

(51) Int. Cl.
*G06F 9/46* (2006.01)
*G06F 15/173* (2006.01)
*G06F 13/00* (2006.01)

(52) U.S. Cl.
USPC ........... 718/105; 718/102; 718/103; 718/104; 709/233; 711/100

(58) Field of Classification Search
None
See application file for complete search history.

(56) References Cited

U.S. PATENT DOCUMENTS

| 4,686,620 | A | 8/1987 | Ng |
|---|---|---|---|
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,321,816 | A | 6/1994 | Rogan et al. |
| 5,333,315 | A | 7/1994 | Saether et al. |

(Continued)

FOREIGN PATENT DOCUMENTS

| EP | 0259912 | 3/1988 |
|---|---|---|
| EP | 0405926 | 1/1991 |

(Continued)

OTHER PUBLICATIONS

Non-Final Office Action for U.S. Appl. No. 11/269,520, Mail Date Dec. 10, 2008, 22 pages.

(Continued)

*Primary Examiner* — Emerson Puente
*Assistant Examiner* — Adam Lee
(74) *Attorney, Agent, or Firm* — Perkins Coie LLP

(57) ABSTRACT

A system and method for choosing a stream to transfer data is described. In some cases, the system reviews running data storage operations and chooses a data stream based on the review. In some cases, the system chooses a stream based on the load of data to be transferred.

16 Claims, 8 Drawing Sheets

U.S. PATENT DOCUMENTS

| | | | |
|---|---|---|---|
| 5,347,653 A | 9/1994 | Flynn et al. | |
| 5,410,700 A | 4/1995 | Fecteau et al. | |
| 5,448,724 A | 9/1995 | Hayashi et al. | |
| 5,465,354 A * | 11/1995 | Hirosawa et al. | 718/106 |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,822,758 A * | 10/1998 | Loper et al. | 711/130 |
| 5,875,478 A | 2/1999 | Blumenau | |
| 5,887,134 A | 3/1999 | Ebrahim | |
| 5,901,327 A | 5/1999 | Ofek | |
| 5,909,594 A * | 6/1999 | Ross et al. | 710/20 |
| 5,924,102 A | 7/1999 | Perks | |
| 5,938,734 A | 8/1999 | Yao et al. | |
| 5,950,205 A | 9/1999 | Aviani, Jr. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem et al. | |
| 6,088,745 A | 7/2000 | Bertagna et al. | |
| 6,094,416 A | 7/2000 | Ying | |
| 6,131,095 A | 10/2000 | Low et al. | |
| 6,131,190 A | 10/2000 | Sidwell | |
| 6,134,482 A * | 10/2000 | Iwasaki | 700/121 |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,243,824 B1 * | 6/2001 | Kakuta et al. | 714/3 |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton et al. | |
| 6,330,642 B1 | 12/2001 | Carteau | |
| 6,343,324 B1 | 1/2002 | Hubis et al. | |
| 6,349,312 B1 | 2/2002 | Fresko et al. | |
| RE37,601 E | 3/2002 | Eastridge et al. | |
| 6,356,801 B1 | 3/2002 | Goodman et al. | |
| 6,374,336 B1 | 4/2002 | Peters et al. | |
| 6,389,432 B1 | 5/2002 | Pothapragada et al. | |
| 6,421,711 B1 | 7/2002 | Blumenau et al. | |
| 6,487,561 B1 | 11/2002 | Ofek et al. | |
| 6,505,216 B1 | 1/2003 | Schutzman et al. | |
| 6,519,679 B2 | 2/2003 | Devireddy et al. | |
| 6,538,669 B1 | 3/2003 | Lagueux, Jr. et al. | |
| 6,542,972 B2 | 4/2003 | Ignatius et al. | |
| 6,553,369 B1 * | 4/2003 | Soule et al. | 705/7.12 |
| 6,557,052 B1 | 4/2003 | Kubo | |
| 6,564,228 B1 | 5/2003 | O'Connor | |
| 6,587,431 B1 | 7/2003 | Almulhem et al. | |
| 6,647,472 B2 * | 11/2003 | Atkinson et al. | 711/158 |
| 6,658,526 B2 | 12/2003 | Nguyen et al. | |
| 6,691,136 B2 | 2/2004 | Lee et al. | |
| 6,760,765 B1 | 7/2004 | Asai et al. | |
| 6,760,808 B2 | 7/2004 | Peters et al. | |
| 7,010,626 B2 | 3/2006 | Kahle | |
| 7,047,309 B2 | 5/2006 | Baumann et al. | |
| 7,111,115 B2 * | 9/2006 | Peters et al. | 711/112 |
| 7,159,072 B2 * | 1/2007 | Kitamura | 711/112 |
| 7,161,994 B2 | 1/2007 | Shah et al. | |
| 7,188,367 B1 * | 3/2007 | Edwards et al. | 726/24 |
| 7,238,218 B2 | 7/2007 | Hepner et al. | |
| 7,251,691 B2 | 7/2007 | Boyd et al. | |
| 7,406,473 B1 | 7/2008 | Brassow et al. | |
| 7,487,309 B2 * | 2/2009 | Peters et al. | 711/162 |
| 7,562,362 B1 * | 7/2009 | Paquette et al. | 718/102 |
| 7,606,967 B2 | 10/2009 | Konno | |
| 7,757,013 B1 * | 7/2010 | Lawson et al. | 710/15 |
| 7,793,000 B2 | 9/2010 | Rosenau | |
| 7,873,153 B2 * | 1/2011 | Bukovec et al. | 379/220.01 |
| 7,877,558 B2 * | 1/2011 | Hughes et al. | 711/158 |
| 7,940,756 B1 * | 5/2011 | Duffy et al. | 370/389 |
| 2003/0061261 A1 * | 3/2003 | Greene | 709/104 |
| 2003/0156589 A1 * | 8/2003 | Suetsugu | 370/396 |
| 2003/0169688 A1 * | 9/2003 | Mott | 370/230 |
| 2003/0195920 A1 * | 10/2003 | Brenner et al. | 709/107 |
| 2003/0212731 A1 * | 11/2003 | Brenner et al. | 709/105 |
| 2004/0064488 A1 * | 4/2004 | Sinha | 707/204 |
| 2004/0111532 A1 * | 6/2004 | Connor | 709/246 |
| 2004/0243763 A1 * | 12/2004 | Peters et al. | 711/114 |
| 2004/0244001 A1 * | 12/2004 | Haller et al. | 718/100 |
| 2005/0055520 A1 * | 3/2005 | Kappler | 711/162 |
| 2005/0132257 A1 | 6/2005 | Gold et al. | |
| 2005/0198634 A1 * | 9/2005 | Nielsen et al. | 718/100 |
| 2005/0210128 A1 * | 9/2005 | Cannon et al. | 709/224 |
| 2005/0210472 A1 * | 9/2005 | Accapadi et al. | 718/105 |
| 2006/0047895 A1 * | 3/2006 | Rowan et al. | 711/112 |
| 2006/0068812 A1 * | 3/2006 | Carro et al. | 455/456.3 |
| 2006/0126559 A1 * | 6/2006 | Jun et al. | 370/329 |
| 2006/0259725 A1 | 11/2006 | Saika et al. | |
| 2006/0288346 A1 * | 12/2006 | Santos et al. | 718/102 |
| 2007/0022148 A1 | 1/2007 | Akers et al. | |
| 2007/0050778 A1 * | 3/2007 | Lee et al. | 718/107 |
| 2007/0168715 A1 * | 7/2007 | Herz et al. | 714/13 |
| 2007/0198977 A1 * | 8/2007 | Abernethy et al. | 718/100 |
| 2007/0255920 A1 * | 11/2007 | Gold | 711/170 |
| 2008/0195824 A1 * | 8/2008 | Sadovsky et al. | 711/158 |
| 2008/0229318 A1 * | 9/2008 | Franke | 718/104 |
| 2008/0235317 A1 * | 9/2008 | Burgmans | 709/201 |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," *IEEE*, 1994, pp, 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 11/269,520, Gokhale et al.

U.S. Appl. No. 11/963,581, Gokhale.

U.S. Appl. No. 11/963,555, Gokhale.

* cited by examiner

SYSTEMS AND METHODS OF DATA STORAGE MANAGEMENT, SUCH AS DYNAMIC DATA STREAM ALLOCATION

CROSS-REFERENCE TO RELATED APPLICATION(S)

This is a continuation application of U.S. patent application Ser. No. 11/963,581, filed on Dec. 21, 2007, which claims priority to U.S. Provisional Patent Application No. 61/007,524, filed on Dec. 22, 2006, entitled SYSTEMS AND METHODS OF DATA STORAGE MANAGEMENT, SUCH AS DYNAMIC DATA STREAM ALLOCATION, each of which is incorporated by reference in its entirety.

This application is related to the following pending U.S. application, which is hereby incorporated herein by reference in its entirety:

U.S. patent application Ser. No. 10/990,357 filed on Nov. 15, 2004, entitled SYSTEM AND METHOD FOR COMBINING DATA STREAMS IN PIPELINED STORAGE OPERATIONS ON A STORAGE NETWORK.

BACKGROUND

Systems used to perform data storage operations of electronic data are growing in complexity. However, current systems may not be able to accommodate increased data storage demands or efficient and timely restore operations.

Often, these systems are required to store large amounts of data (e.g. all of a company's data files) during a time period known as a "storage window." The storage window defines a duration and actual time period when the system may perform storage operations. For example, a storage window may be for twelve hours, between 6 PM and 6 AM (that is, twelve non-business hours).

Often, storage windows are rigid and unable to be modified. Therefore, when data storage systems attempt to store increasing data loads, they may need to do so without increasing the time in which they operate. Additionally, many systems perform daily stores, which may add further reliance on completing storage operations during allotted storage windows.

Additionally, or alternatively, current systems may attempt to store a large number of distinct jobs, or groups of data, chunks of data, and so on. The system may look at each job as a separate storage operation, which often leads to fragmentation on secondary storage devices (tapes, magnetic disks, and so on) that receive data stores as the storage devices develop small gaps of unused space between spaces containing data. In these cases, the system may inefficiently restore stored data because of the fragmentation that occurs during the data storage process.

The foregoing examples of some existing limitations are intended to be illustrative and not exclusive. Other limitations will become apparent to those of skill in the art upon a reading of the Detailed Description below. These and other problems exist with respect to data storage management systems.

Figure 1A:
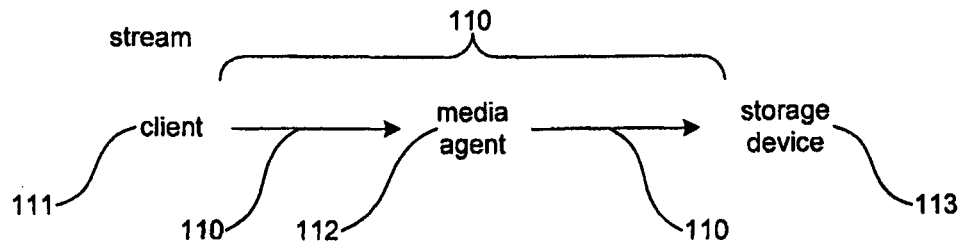
FIG. 1A is a block diagram illustrating an example of components used in data storage operations.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 420 is first introduced and discussed with respect to FIG. 4).

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

DETAILED DESCRIPTION

Examples of the technology are directed to systems and methods that dynamically improve, modify, and/or correct data flows in data storage operations. In some examples, the system dynamically selects a path to transfer data from a client server to a secondary storage device using information received during a data storage operation or using information associated with, related to, or otherwise from the data storage operation. During storage operations using multiple data transfer paths (or, data streams), the system may selectively choose a stream based on a number of characteristics, such as the load on a stream, the type of secondary storage device, the load on the secondary storage device, the nature of the data, the availability of components, information related to prior storage operations, and so on.

In some examples, the system dynamically modifies storage operations based on a storage window for the storage operations. For example, the system may monitor the progress of the data being stored (such as the amount of data stored and to be stored) versus the time remaining in the storage window for the storage operation. The system may then choose to modify storage operations when needed, such as delaying some storage operations, utilizing additional or alternative resources, and so on.

In some examples, the system may pre-allocate disk space before transferring data to a secondary storage device (or, in some cases, a primary storage device) using the methods described herein. For example, the system may pre-allocate disk space in order to reduce disk fragmentation when copying a number of jobs (data files, exchange files, SQL files, and other data) to a secondary storage device. The system may dynamically determine that a secondary storage device contains a certain amount of free disk space, and pre-allocate the disk space based on such information. Additionally, or alternatively, the system may refer to storage operation statistics (such as historical statistics, failure statistics, jobs statistics, and so on) when pre-allocating disk space.

Various examples of the system will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1A, a block diagram illustrating components of a data stream is shown. The stream 110 may include a client 111, a media agent 112, and a secondary storage device 113. For example, in storage operations, the system may store, receive and/or prepare data to be stored, copied or backed up at a server or client 111. The system may then transfer the data to be stored to media agent 112, which may then refer to storage policies, schedule policies, and/or retention policies (and other policies), and then choose a secondary storage device 113 for storage of the data. Secondary storage devices may be magnetic tapes, optical disks, USB and other similar media, disk and tape drives, and so on.

Figure 1B:
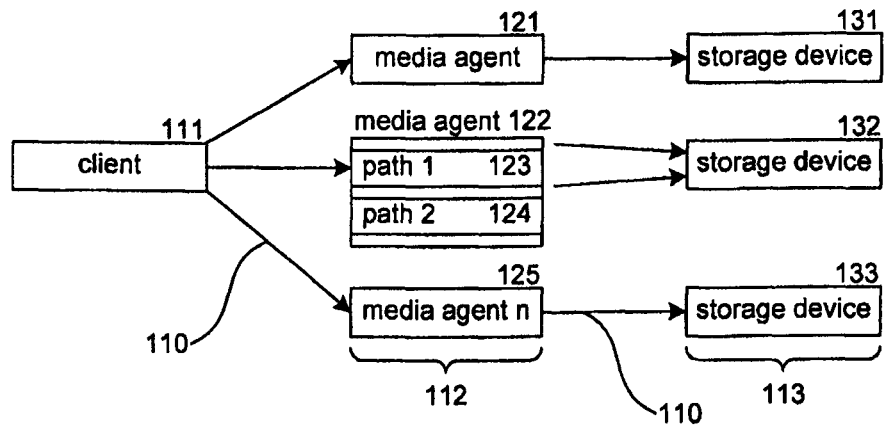
FIG. 1B is a block diagram illustrating an alternative example of components used in data storage operations.

Referring to FIG. 1B, a block diagram illustrating components of multiple selectable data streams is shown. Client 111 and any one of multiple media agents 112 may form a stream 110. For example, one stream may contain client 111, media agent 121, and storage device 131, while a second stream may use media agent 125, storage device 133, and the same client 111. Additionally, media agents may contain additional subpaths 123, 124 that may increase the number of possible streams for client 111. Examples of subpaths 123, 124 include host bus adapter (HBA) cards, Fibre Channel cards, SCSI cards, and so on. Thus, the system is able to stream data from client 111 to multiple secondary storage devices 113 via multiple media agents 112 using multiple streams.

Figure 1C:
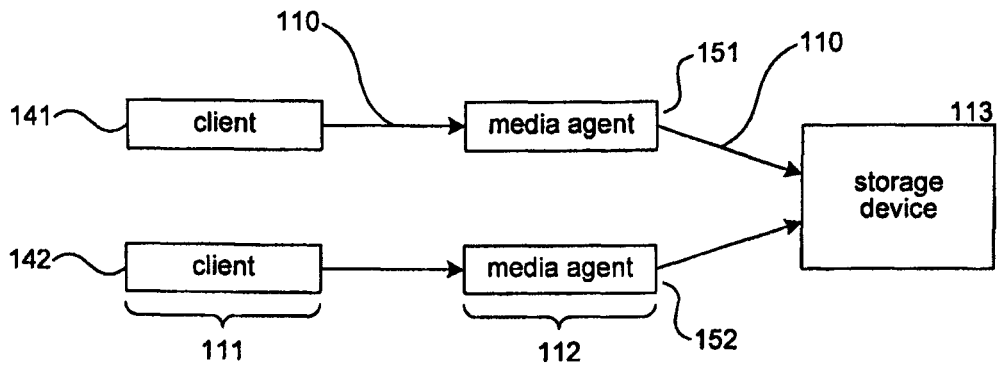
FIG. 1C is a block diagram illustrating an alternative example of components used in data storage operations.

Referring to FIG. 1C, a block diagram illustrating components of alternative multiple selectable data streams is shown. In this example, the system may transfer data from multiple media agents 151, 152 to the same storage device 113. For example, one stream may be from client 141, to media agent 151, to secondary storage device 113, and a second stream may be from client 142, to media agent 152, to secondary storage device 113. Thus, the system is able to copy data to one secondary storage device 113 using multiple streams 110.

Additionally, the system may stream may be from one client to two media agents and to one storage device. Of course, the system may employ other configurations of stream components not shown in the Figures.

Figure 2:
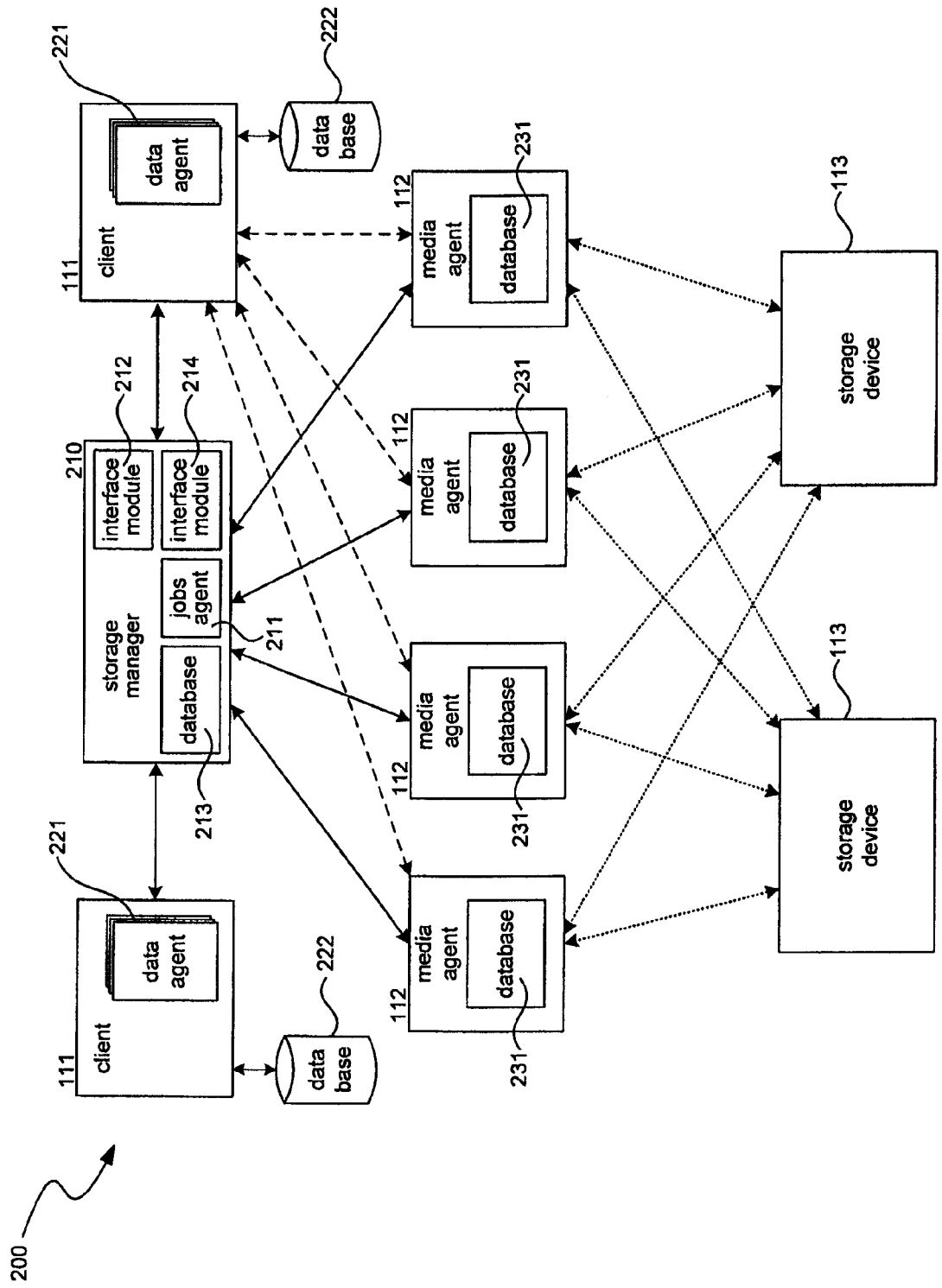
FIG. 2 is a block diagram illustrating an example of a data storage system.

Referring to FIG. 2, a block diagram illustrating an example of a data storage system 200 is shown. Data storage systems may contain some or all of the following components, depending on the needs of the system.

For example, the data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. Client databases 222 may contain data files and other information, while media agent databases may contain indices and other data structures that assist and implement the storage of data into secondary storage devices, for example.

The data storage system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. The data copies may include snapshot copies, backup copies, HSM copies, archive copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical bucket in which to transfer, store or copy data from a source to a data store, such as storage media. Storage policies may be stored in storage manager 210, or may be stored in other resources, such as a global manager, a media agent, and so on. Further details regarding storage management and resources for storage management will now be discussed.

Figure 3:
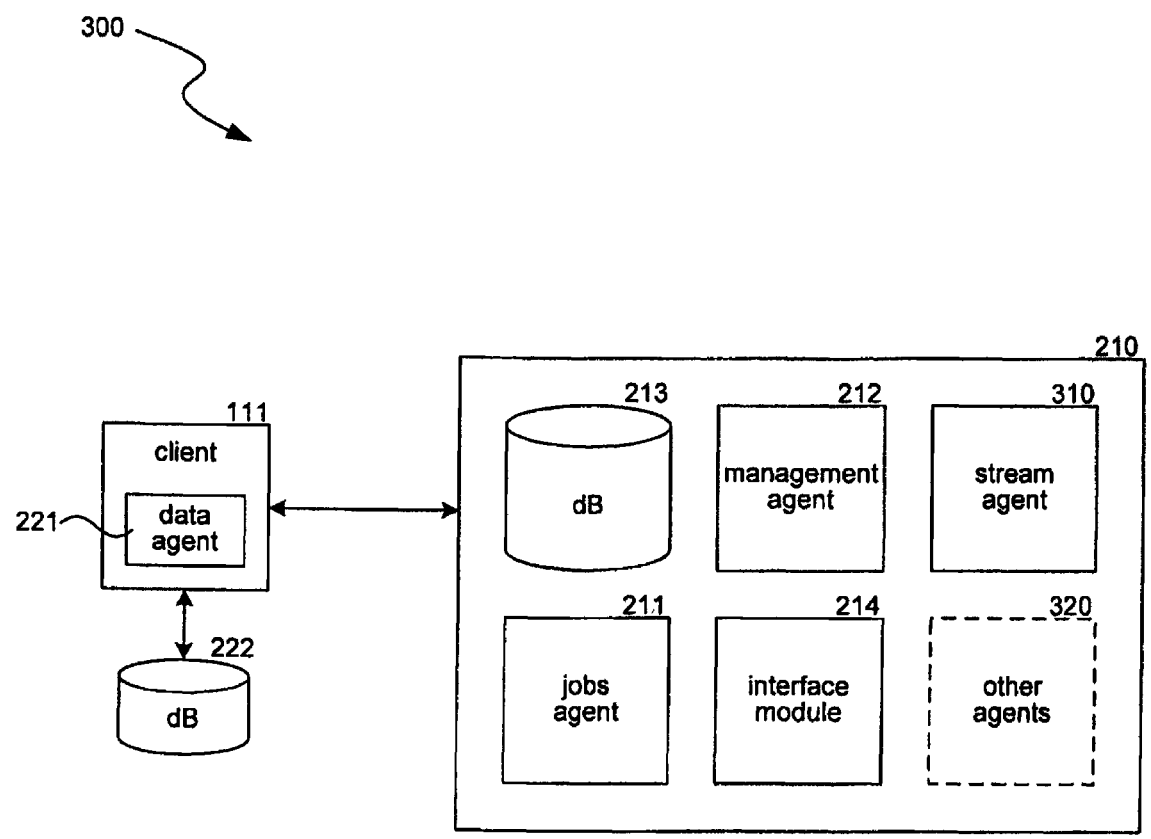
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to primary or secondary storage. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs).

Dynamic Stream Management

The storage manager 310 may also contain a stream agent (or a module or program code) that communicates with the other agents, components and/or the system to identify and/or create data streams to be used during data storage operations. For example, stream agent 310 may contact the management agent 212 to retrieve load information for running data streams, and instruct the jobs agent 211 to send pending or future storage jobs to streams based on the retrieved load information. Further details with respect to the stream agent 310 will be discussed below. The storage manager may also contain other agents 320 used in dynamic management of the data storage system, such as pre-allocation agents, to be discussed herein.

Figure 4:
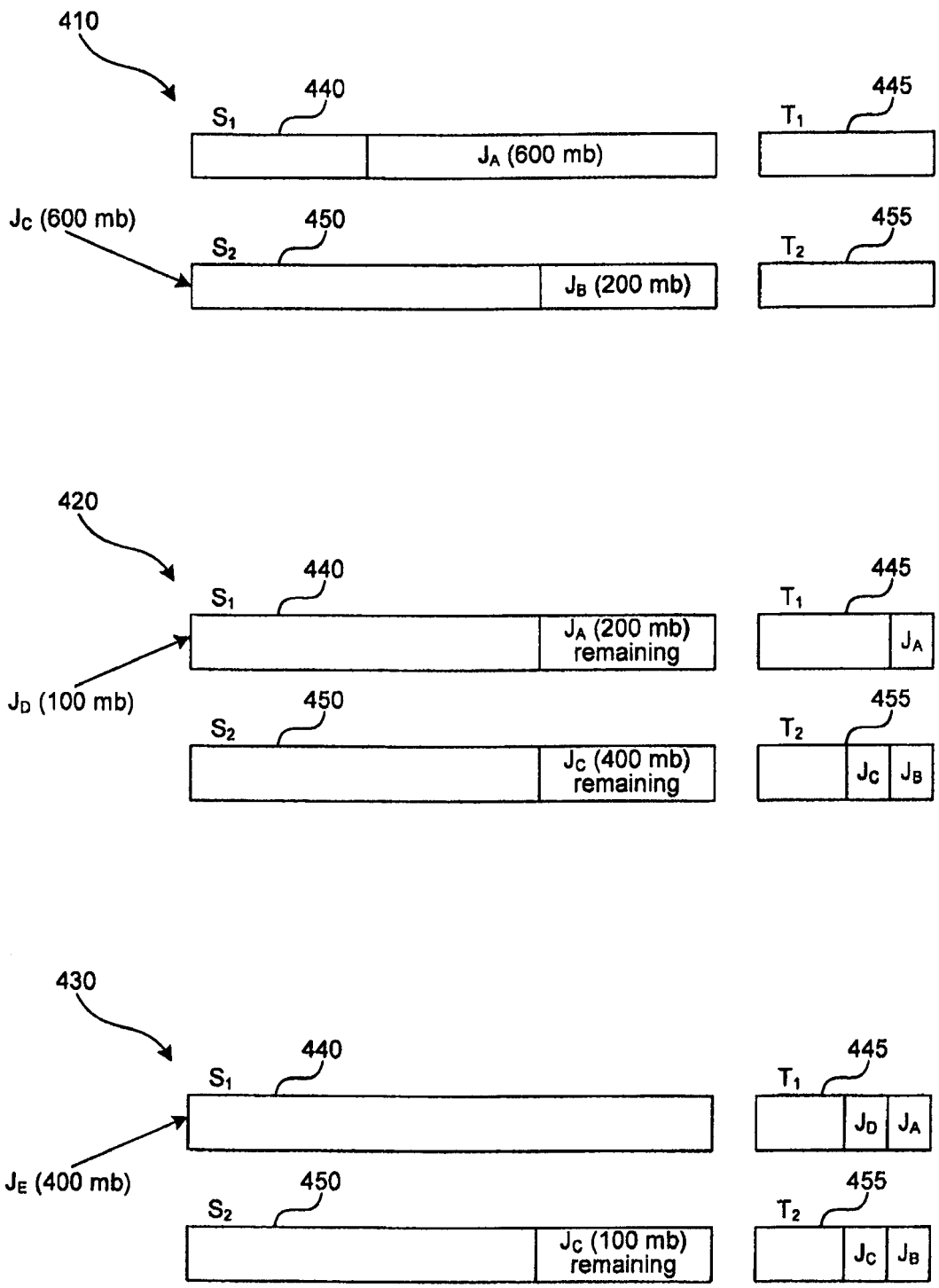
FIG. 4 is a block diagram illustrating an example of data stream allocation.

Referring to FIG. 4, a block diagram illustrating an example of data stream allocation is shown. In this example, the system allocates a stream based on a set of predetermined or dynamically changing selection criteria. For example, the system may select any stream under a pre-determined threshold of usage (such as under a threshold amount of data queued to use the stream during transfer). In another example, the system, may select a stream through which to transfer data having the determined fastest rate of transfer or predicted fastest rate of transfer.

For example, at time A, designated as subdiagram 410, stream 440 contains Job A with 600 MB of data to be copied to tape 445, and stream 450 contains Job B with 200 MB of data to be copied to tape 455. The system receives Job C, a 600 MB job, and, referring to a related schedule policy, looks to choose a stream to receive and queue the job at time A.

Reviewing the streams involved in data storage operations at time A, the system determines stream 450 has a smaller load allocated to it (e.g., less data), and sends Job C to stream 450. Therefore, the system dynamically reviews a data storage operation in selecting a data path (stream) for copying data to secondary storage devices.

At a later time B, designated as subdiagram 420, the system receives another job, Job D, and again dynamically reviews currently running data storage operations (that is, the streams in use by the system) in order to allocate the job to the stream with the least amount of data in a queue servicing the stream. Between time A and time B, both streams have copied 400 MB of data to storage devices 445 and 455. One of ordinary skill in the art will realize that the data streams will often not copy data at the same rate.

At time B, stream 440 is allocated 200 MB of data (400 MB of Job A have been transferred to secondary storage device 445, leaving 200 MB remaining to be transferred), and stream 450 is allocated 400 MB of data (all 200 MB of Job A have been transferred to secondary storage device 455, and 200 MB out of 600 MB of Job C have also been transferred). Therefore, the system determines that stream 450 has more data to transfer, and allocates or queues the newly received Job D to stream 440, the stream with less data to transfer, as stream 440 is allocated 200 MB less than stream 450.

In this example, should stream 440 transfer data at a slower rate than stream 450 (such as at $\frac{1}{10}^{th}$ the speed), the system may determine that stream 440 would have more data allocated to be transferred, and choose stream 450 instead.

At a later time C, designated as subdiagram 430, the system receives another job, Job E, and again dynamically reviews the running data storage operations in order to allocate the job to the lightest loaded stream. Between time B and time C, both streams have copied 300 MB of data to storage devices 445 and 455.

At time C, stream 440 no data is queued (Job A and Job D have been transferred to secondary storage device 445), and stream 450 is queued 100 MB of data (all of Job B and 300 MB of Job C have been transferred to secondary storage device 455). Even though stream 440 was allocated the last job (Job D), the system also allocates newly received Job E to stream 440 because less data is queued at stream 440. Therefore, in this example, the system does not select streams or allocate data to streams based on order or the number of jobs previously sent to the stream. Instead, the system chooses streams based on a dynamic review of the loads running on the streams.

Alternatively, or additionally, the system may choose a stream or streams based on or in addition to other dynamic measures of running data storage operations. The system may look at the data load of running streams (as discussed above) and a data transfer rate for each stream. In the cases where streams are not transferring data at equal rates (e.g., one is slower than another), the system may choose a stream based on the transfer rate, or on both the load and the transfer rate.

For example, a stream M may have allocated 100 MB of data to transfer to a storage device M, and a stream N may have allocated 50 MB of data to transfer to storage device N (or, another storage device), and stream M is transferring data at 10 times the speed of stream N. When the system receives a new job, the system may allocate the new job to stream M because the system expects or predicts stream M to complete its current load transfer before stream N completes its current load transfer. In this example, therefore, the system may choose a data stream for a new job transfer based on determining a stream that will likely be the first available stream for a data transfer.

The system may look to any number of different combinations of dynamic views of data storage operations in choosing data paths for data transfers, as noted herein. For example, the system may exchange information with monitoring or feedback systems that know and regulate the transfer rates of streams and their components, and determine load information based on this exchange.

Alternatively, or additionally, the system may look at a combination of queued jobs for a stream and available storage on a secondary storage device for the stream. If one stream has a few jobs yet to transfer and there is little space on the secondary storage device (and thus, the system may need to replace the secondary storage device), the system may choose another stream to send the next job. For example, the system may need to change a tape or other storage device due to component failures or capacity issues. The system may factor in the time needed to change or replace storage devices, and allocate jobs to other streams until a device has been replaced and the stream (or streams) associated with the device is again capable of data transfers.

Also, the system may switch jobs from one queue to another. For example, the system may send three jobs to a queue that feeds a stream X, and send five jobs to a stream that feeds a stream Y, using information such as the load information described herein. However, while the jobs remain in the respective queues, the system loads or transfer rates may change. The system, therefore, may reassign some or all of the queued jobs to other queues or available streams, in order to compensate for system changes. For example, after a certain time, stream X may have completed one jobs transfer (having two remaining jobs to transfer) and stream Y may have completed all five job transfers. As described herein, a number of different factors may contribute to the varied transfer speeds, including job size, component speed, storage device reliability, and so on. In this example, the system, by monitoring the currently running transfers, may notice stream Y is now idle and move one of the two remaining jobs waiting at stream X to stream Y to speed up the overall transfer of jobs by the system.

Other factors may contribute to the selection of a stream by the system. For example, the system may determine or calculate future or predicted storage jobs for a threshold time period and allocate streams based on a current rate of transfer and the calculation of future jobs in the time period. Additionally, the system may determine that one or only a few streams are running to a certain storage device, and keep the one or few streams clear of jobs except for jobs required to be stored in the certain storage device.

Furthermore, the system may prioritize jobs and when or where they are transferred, and allocate jobs to streams based on this prioritization. For example, the system may prioritize jobs based on set preferences, the content, type or nature of the data, user information or other metadata, the state of protection of the data (e.g., the system may allocate unprotected data to efficient and faster streams), and so on.

Figure 5:
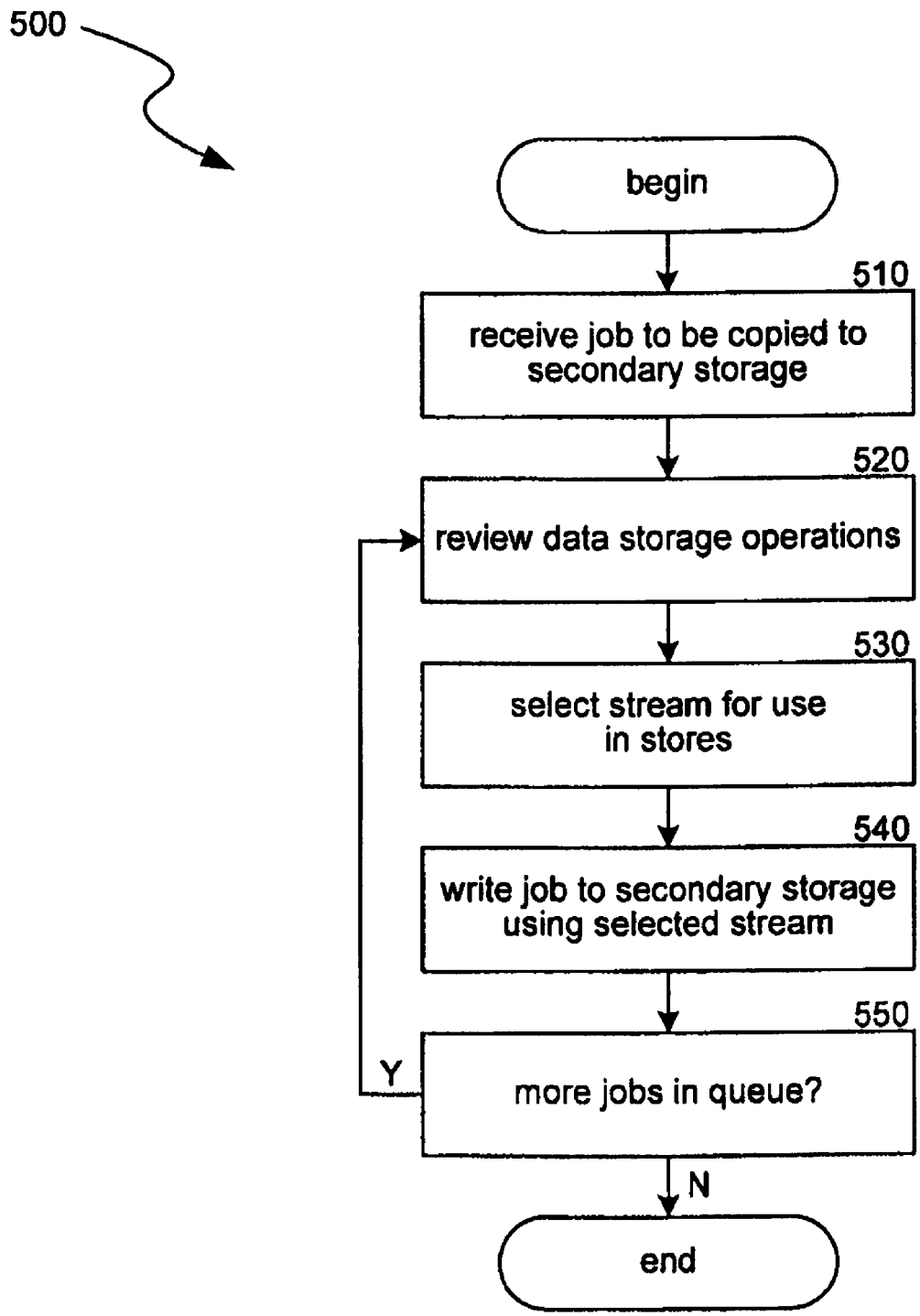
FIG. 5 is a flow diagram illustrating an example of a dynamic stream allocation routine.

Referring to FIG. 5, a flow diagram illustrating a routine 500 as an example of dynamic stream allocation is shown. In step 510, the system may receive a job (of data) to be copied or transferred to a secondary storage device, such as a magnetic tape in a media library. The system, in step 520, triggered by the received job, reviews running data storage operations (other jobs of data being transferred to secondary storage devices) being performed on data paths, or data streams. In the review, the system may retrieve information related to data loads, transfer rates, and so on.

The system may retrieve or receive such information in a number of ways. For example, the system may consult or utilize management agents 212 or other agents running on a host server. The system may look to media agents 112 and, for example, sample or retrieve information related to the amount of data transferred by the media agent 112. The system may look to header information in or for jobs. For example, the system may receive a job into a buffer, review information contained in a header at a beginning of a job, and feed the jobs from the buffer to an appropriate stream based on the information.

In step 530, the system selects a stream to use in transferring the received job to secondary storage. The system may select a stream based on some or all of the information retrieved in the dynamic review of step 520. The system, in step 540, transfers the job to secondary storage via the stream selected in step 530. In step 550, the system determines if there are more jobs to be transferred. If there are more jobs to be transferred, routine 500 proceeds back to step 520, and the system proceeds as described above. If there are no more jobs to be transferred, routine 500 ends.

Figure 6:
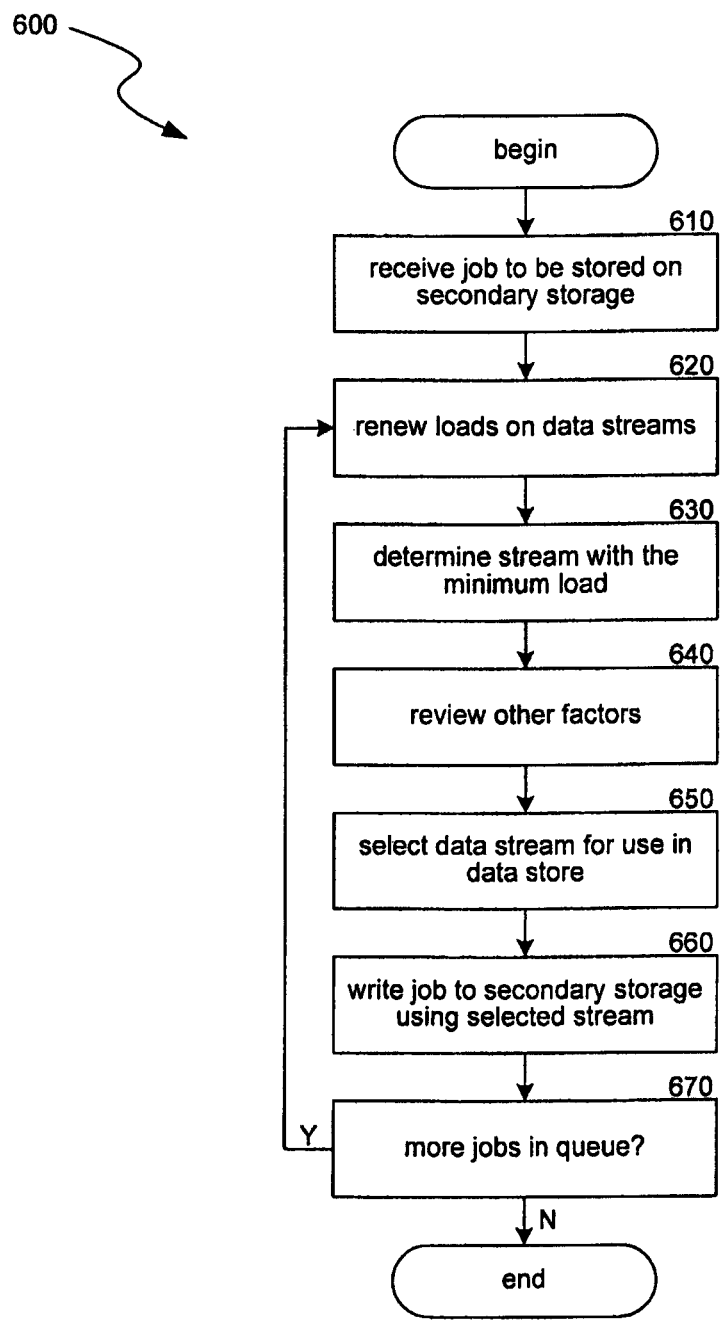
FIG. 6 is a flow diagram illustrating an example of a routine for selecting a data stream to perform a storage operation.

Referring to FIG. 6, a flow diagram illustrating a routine 600 as an example of selecting a data stream to perform a storage operation is shown. In step 610, the system identifies one or more jobs (such as groups of data files) to be backed up via data streams to a storage device. In step 620, the system reviews running job transfers, or loads, on available data streams. In step 630, the system determines the stream with the minimum load of data to be transferred. Optionally, the system, in step 640, may also review other dynamic factors or selection or allocation criteria, such as stream transfer rates, stream error rates, stream component reliability, and so on. In step 650, the system selects the stream based on one or more of these factors with the minimum allocated load (or, selects a stream based on the load and other factors as determined in optional step 640). In step 660, the system writes the job or jobs to secondary storage via the selected stream. In step 670, the system checks to see if more jobs are present in a job queue (that is, if there are more jobs to be transferred to secondary storage). If there are more jobs present, routine 600 proceeds back to step 620, else routine 600 ends.

The system may also allocate streams to balance the impact of physical use on drives or the secondary storage devices. For example, the system may factor in the number of uses of tape drives (and shorter lived components, such as tape heads), and allocate future jobs to streams associated with infrequently used drives. In this example, tape drives (or components thereof) of the system may age at similar rates, reducing the risk of overworking some resources in lieu of others. The system may know usage and/or failure rates of its components, and use this information in stream allocation, thereby balancing the use and life of system resources.

Using the Data Storage Window to Determine Storage Operations

In some cases, the system may look to a data storage window during a data storage operation. As discussed above, a data storage window is a pre-determined period of time when the system may perform data stores. Often, this window is rigid. Systems attempt to complete all required data transfers within the window. Therefore, a dynamic review of the storage window during data storage operations may assist storage systems in completing storage tasks within an allotted window of time.

Figure 7:
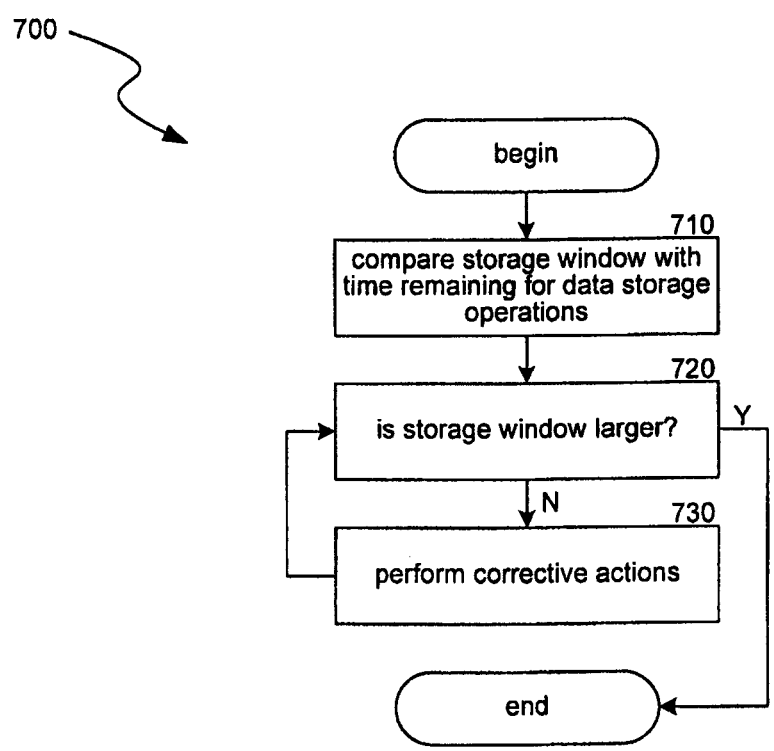
FIG. 7 is a flow diagram illustrating an example of a routine for selecting storage resources in a data storage operation.

Referring to FIG. 7, a flow diagram illustrating a routine 700 as an example of selecting storage resources in a data storage operation begins in step 710, where the system may compare the storage window with an estimated time remaining to complete data storage operations. For example, the system may estimate the time required to complete all pending job transfers, and compare the estimated time with the time allotted to run data transfers. In step 720, if the time allotted is larger than the time estimate, routine 700 ends, else routine 700 proceeds to step 730. In step 730, the system performs corrective operations. Examples of corrective operations may include the dynamic stream management discussed above, using more resources, selecting a subset of the remaining jobs to store, sending remaining jobs to an alternative or "standby" data storage system, and so on. After performing corrective actions, routine 700 proceeds back to step 720, and compares the new estimated time against the time allotment.

In some cases, the system may review, monitor, or track default pathways (such as streams) and modify storage operations if there is not enough time in the storage window to complete all data transfers using the default pathways. For example, the system may select high speed pathways instead of default pathways for data of a certain type and nature (such as high priority or unprotected data).

The system may perform routine 700 as infrequently or as often as necessary, depending on the needs of the system or the progress of data storage operations. The system may perform routine 700 to glean information about data storage operations, to be used in performing corrections at a later time. The system may determine patterns, statistics, and/or historical information from routine 700. For example, in a 12 hour time allotted storage window, the system may run routine 700 twelve times, once per hour. Comparing the twelve iterations, the system may determine a pattern of high resource use, low resource use, and so on, and modify future data storage operations accordingly.

Figure 8:
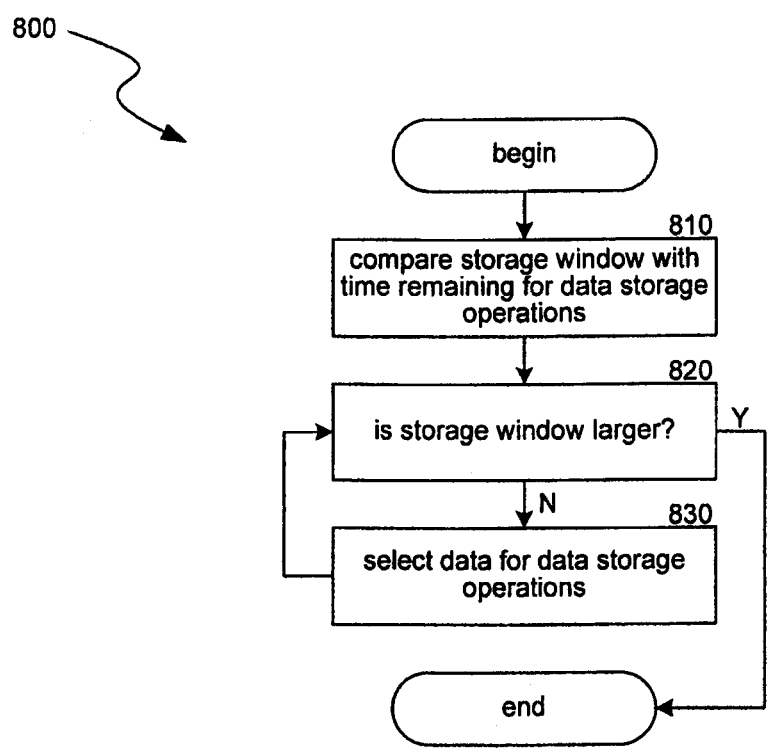
FIG. 8 is a flow diagram illustrating an example of a routine for performing a selective storage operation.

In some cases, the system may be able to delay the transfer of some types of data in order to store other types of data within the storage window. Referring to FIG. 8, a flow diagram illustrating an example of performing a selective storage operation is shown. In step 810, the system may compare the storage window with an estimated time remaining to complete data storage operations. For example, the system may estimate the time required to complete all pending job transfers, and compare the estimated time with the time allotted to run data stores. In step 820, if the time allotted is larger than the time estimate, routine 800 ends, else routine 800 proceeds to step 830. In step 830, the system may select certain jobs to store, and delay other jobs. For example, the system may be able to store some types of data outside of the storage window. The system selects these jobs and moves them out of the job queue, to a delayed jobs queue.

After selecting "priority" jobs, routine 800 proceeds back to step 820, and compares the new estimated time against the time allotment. The system transfers all "priority" jobs, and only goes to the delayed job queue after the main job queue is empty. The system may then transfer the delayed jobs during the remaining time of the storage window, may transfer the jobs outside of the job window, or may be able to send the jobs to the next scheduled data store or data transfer, and transfer the jobs during that operation.

Assigning some jobs as priority may be arbitrary or contingent on the needs of the system. The system may assign priorities to types of files or jobs within a storage policy 210. The system may enable users to determine what types of jobs are priority jobs. The system may maintain some jobs as always being priority, or may change these preferences on a case by case basis. For example, a user may set a policy to flag all financial data as "priority," and set a policy to never flag email data (or email from certain user groups) as "priority." However, in some case, the reverse may be more desirable. In some cases, the system may update or modify metadata, data classification or other preferences, and may assign priorities to characteristics of data as well as to data.

Conclusion

The system may perform some or all of the above examples in combination with one another. For example, the system may use aspects of dynamic stream management to choose a stream to transfer a data store job, and may transfer that job within pre-allocated disk space for multiple jobs. The system may trigger dynamic stream management processes based on a review of the storage window.

The system may perform pre-allocation when the storage window is short and an otherwise defragmentation of disks may cause the data storage operations to exceed the storage window. The system may perform other combinations to modify and improve data storage operations as needed.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the system can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While certain aspects of the technology are presented below in certain claim forms, the inventors contemplate the various aspects of the technology in any number of claim forms. For example, while only one aspect of the technology is recited as a means-plus-function claim under 35 U.S.C. sec. 112, other aspects may likewise be embodied as a means-plus-function claim. Accordingly, the inventors reserve the right to add additional claims after filing the application to pursue such additional claim forms for other aspects of the technology.

The above detailed description of examples of the technology is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the system can be modified, if necessary, to employ the systems, functions, and concepts of the various references described above to provide yet further examples of the technology.

These and other changes can be made to the system in light of the above Detailed Description. While the above description describes certain embodiments of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the system have been described herein for purposes of illustration, but that various modifications may be made without deviating from the spirit and scope of the system. Accordingly, the system is not limited except as by the appended claims.

We claim:

1. A computer-implemented method of adapting data storage operations to meet a predetermined time window, the method comprising:
   identifying the predetermined time window allocated for a backup operation, wherein the backup operation comprises two or more backup jobs, and wherein each of the two or more backup jobs include at least one data copy operation;
   assigning at least one backup job in the backup operation to a first data stream, wherein the first data stream comprises a first media agent and a first storage device;
   assigning at least one backup job in the backup operation to a second data stream, the second data stream comprising a second media agent and a second storage device, wherein the first media agent is different from the second media agent and the first storage device is different from the second storage device;
   during the predetermined time window, monitoring the performance of the first and second data streams;
   during the predetermined time window, predicting at predetermined time intervals, based at least on the monitored performance of the first and second data streams, whether all of the two or more backup jobs in the backup operation will complete during the predetermined time window; and
   when it is predicted that not all of the two or more backup jobs in the backup operation will complete during the predetermined time window,
   re-assigning at least one backup job from the first data stream to the second data stream,
   ordering the two or more backup jobs based on a priority determined from types of data within the two or more backup jobs;
   performing backup jobs with higher priority before performing backup jobs having lower priority, and
   changing speed of a data backup job based on the determined priority.

2. The method of claim 1, further comprising: when it is predicted that not all of the two or more backup jobs in the backup operation will complete during the predetermined time window, allocating additional storage resources to the backup operation.

3. The method of claim 1, further comprising: when it is predicted that not all of the two or more backup jobs in the backup operation will complete during the predetermined time window, selecting a subset of backup jobs and completing the selected backup jobs before performing the unselected backup jobs.

4. The method of claim 1 wherein predicting whether all of the two or more backup jobs in the backup operation will complete during the predetermined time window is performed continuously during the predetermined time window.

5. The method of claim 1, further comprising: when it is predicted that not all of the two or more backup jobs in the backup operation will complete during the predetermined time window, transferring some of the two or more backup jobs to a future backup operation that is performed during a future time window different than the predetermined time window.

6. The method of claim 1, further comprising:
   when it is predicted that not all of the two or more backup jobs in the backup operation will complete during the predetermined time window, ordering the two or more backup jobs based on a priority determined from user input; and
   performing backup jobs with higher priority before performing backup jobs having lower priority.

7. A non-transitory computer-readable medium storing instruction that, when executed by at least one data processing device, performs a method of adapting data storage operations to meet a predetermined time window comprising:
   identifying the predetermined time window allocated for a backup operation,
   wherein the backup operation comprises two or more backup jobs;

assigning at least one backup job in the backup operation to a first data stream, the first data stream comprising a first media agent and a first storage device;

assigning at least one backup job in the backup operation to a second data stream, the second data stream comprising a second media agent and a second storage device, wherein the first media agent is different from the second media agent and the first storage device is different from the second storage device;

at one or more points during the predetermined time window, monitoring the performance of the first and second data streams;

during the predetermined time window, predicting at predetermined time intervals, based at least on the monitored performance of the first and second data streams, whether all of the two or more backup jobs in the backup operation will complete during the predetermined time window; and when it is predicted that not all of the two or more backup jobs in the backup operation will complete during the predetermined time window, re-assigning at least one backup job from the first data stream to the second data stream, ordering the two or more backup jobs based on a priority determined from types of data within the two or more backup jobs;

performing backup jobs with higher priority before performing backup jobs having lower priority, and changing speed of a data backup job based on the determined priority.

8. The computer-readable medium of claim 7, wherein the method further comprises: when it is predicted that not all of the two or more backup jobs in the backup operation will complete during the predetermined time window, allocating additional storage resources to the backup operation.

9. The computer-readable medium of claim 7, wherein the method further comprises: when it is predicted that not all of the two or more backup jobs in the backup operation will complete during the predetermined time window, selecting a subset of backup jobs and completing the selected backup jobs before performing the unselected backup jobs.

10. The computer-readable medium of claim 7 wherein predicting whether all of the two or more backup jobs in the backup operation will complete during the predetermined time window is performed continuously during the predetermined time window.

11. The computer-readable medium of claim 7, wherein the method further comprises: when it is predicted that not all of the two or more backup jobs in the backup operation will complete during the predetermined time window, transferring some of the two or more backup jobs to a future backup operation that is performed during a future time window different than the predetermined time window.

12. The computer-readable medium of claim 7, wherein the method further comprises:

when it is predicted that not all of the two or more backup jobs in the backup operation will complete during the predetermined time window, ordering the two or more backup jobs based on a priority determined from user input; and performing backup jobs with higher priority before performing backup jobs having lower priority.

13. A system for adapting data storage operations to meet a backup predetermined time window, the method comprising:

means for identifying the predetermined time window allocated for a backup operation, wherein the backup operation comprises two or more backup jobs;

means for assigning at least one backup job in the backup operation to a first data stream, the first data stream comprising a first media agent and a first storage device;

means for assigning at least one backup job in the backup operation to a second data stream, the second data stream comprising a second media agent and a second storage device, wherein the first media agent is different from the second media agent and the first storage device is different from the second storage device;

means for monitoring the performance of the first and second data streams at one or more points during the predetermined time window;

means for predicting at predetermined time intervals, during the predetermined time window, based at least on the monitored performance of the first and second data streams, whether all of the two or more backup jobs in the backup operation will complete during the predetermined time window; and means for re-assigning at least one backup job from the first data stream to the second data stream when it is predicted that not all of the two or more backup jobs in the backup operation will complete during the predetermined time window, means for ordering the two or more backup jobs based on a priority determined from types of data within the two or more backup jobs;

means for performing backup jobs with higher priority before performing backup jobs having lower priority, and means for changing speed of a data backup job based on the determined priority.

14. The system of claim 13, further comprising: means for allocating additional storage resources to the backup operation when it is predicted that not all of the two or more backup jobs in the backup operation will complete during the predetermined time window.

15. The system of claim 13, further comprising: means for selecting a subset of backup jobs and completing the selected backup jobs before performing the unselected backup jobs when it is predicted that not all of the two or more backup jobs in the backup operation will complete during the predetermined time window.

16. The system of claim 13, further comprising: means for transferring some of the two or more backup jobs to a future backup operation that is performed during a future time window different than the predetermined time window, wherein the transferring occurs when it is predicted that not all of the two or more backup jobs in the backup operation will complete during the predetermined time window.

* * * * *

UNITED STATES PATENT AND TRADEMARK OFFICE
CERTIFICATE OF CORRECTION

PATENT NO. : 8,468,538 B2  
APPLICATION NO. : 12/060151  
DATED : June 18, 2013  
INVENTOR(S) : Attarde et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1235 days.

Signed and Sealed this  
Sixth Day of January, 2015

Michelle K. Lee  
*Deputy Director of the United States Patent and Trademark Office*